United States Patent [19]
Baker et al.

[11] 3,792,801
[45] Feb. 19, 1974

[54] THERMOPLASTIC APPLICATOR WITH SELF-CLEANING SUPPLY RESERVOIR

[75] Inventors: Robert G. Baker, Avon; Eric T. Nord, Oberlin; Alan B. Reighard, Bay Village, all of Ohio

[73] Assignee: Nordson Corporation, Amherst, Ohio

[22] Filed: Oct. 29, 1971

[21] Appl. No.: 193,621

[52] U.S. Cl........ 222/146 HE, 134/19 R, 134/22 R, 219/398, 219/425
[51] Int. Cl............................................. B05c 9/02
[58] Field of Search..................... 219/420–427, 398, 219/425; 222/146 HE, DIG. 10; 134/2, 19 R, 22 R, 38

[56] References Cited
UNITED STATES PATENTS

| | | | |
|---|---|---|---|
| 3,585,361 | 6/1971 | Rosen et al................... | 222/146 HE |
| 3,598,282 | 8/1971 | Phillips et al................. | 222/146 HE |
| 1,785,607 | 12/1930 | Willis........................... | 222/DIG. 10 |
| 825,386 | 7/1906 | Hammond...................... | 219/422 X |
| 3,531,023 | 9/1970 | Mercer........................ | 222/146 HE |
| 2,206,674 | 7/1940 | Ravi et al...................... | 219/421 |
| 3,377,466 | 4/1968 | Paulsen........................ | 219/421 |
| 1,061,433 | 5/1913 | Wicker........................ | 219/422 |
| 2,563,085 | 8/1951 | Utsinger....................... | 134/19 X |
| 3,121,158 | 2/1964 | Hurko.......................... | 219/398 |

Primary Examiner—Robert B. Reeves
Assistant Examiner—David A. Scherbel
Attorney, Agent, or Firm—Wood, Herron & Evans

[57] ABSTRACT

An applicator for melting thermoplastic material and supplying the molten or liquid material under pressure and at a controlled temperature to an applicator head. The material is melted by a heated grid through which it passes to a storage reservoir. From the reservoir it is pumped to a gun type applicator head. The pump is a single piston double-acting pump that is driven by an air motor. The liquid reservoir, the pump, the applicator gun, and the hose connecting the gun to the pump are all heated and maintained at an even temperature so that there are neither hot spots nor cold spots in the system. The applicator incorporates a self-cleaning mechanism for cleaning the grid and the tank by heating the degraded carbonaceous hot melt material to a temperature at which it is decomposed and converted to a powdered ash that is easily removed.

21 Claims, 6 Drawing Figures

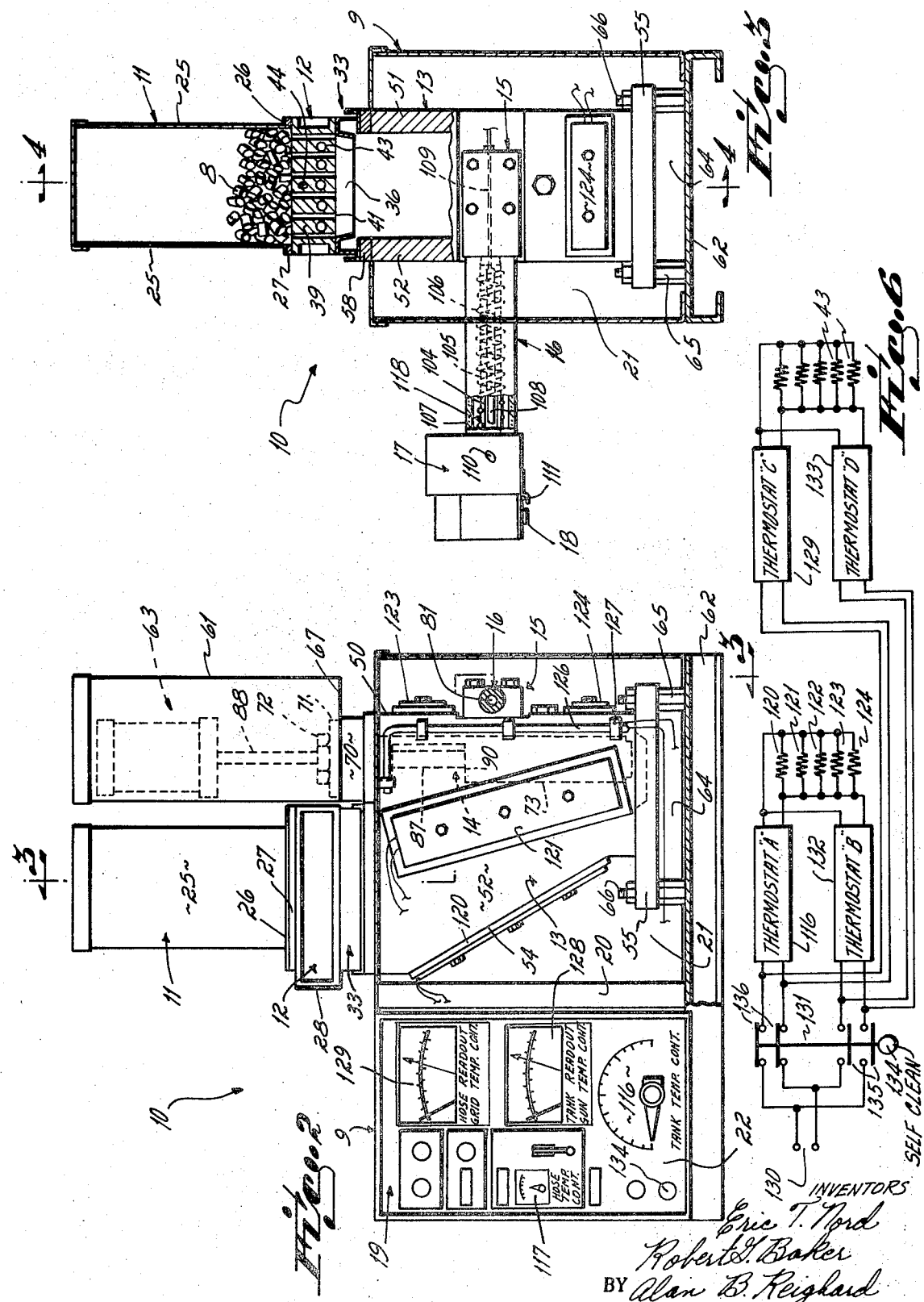

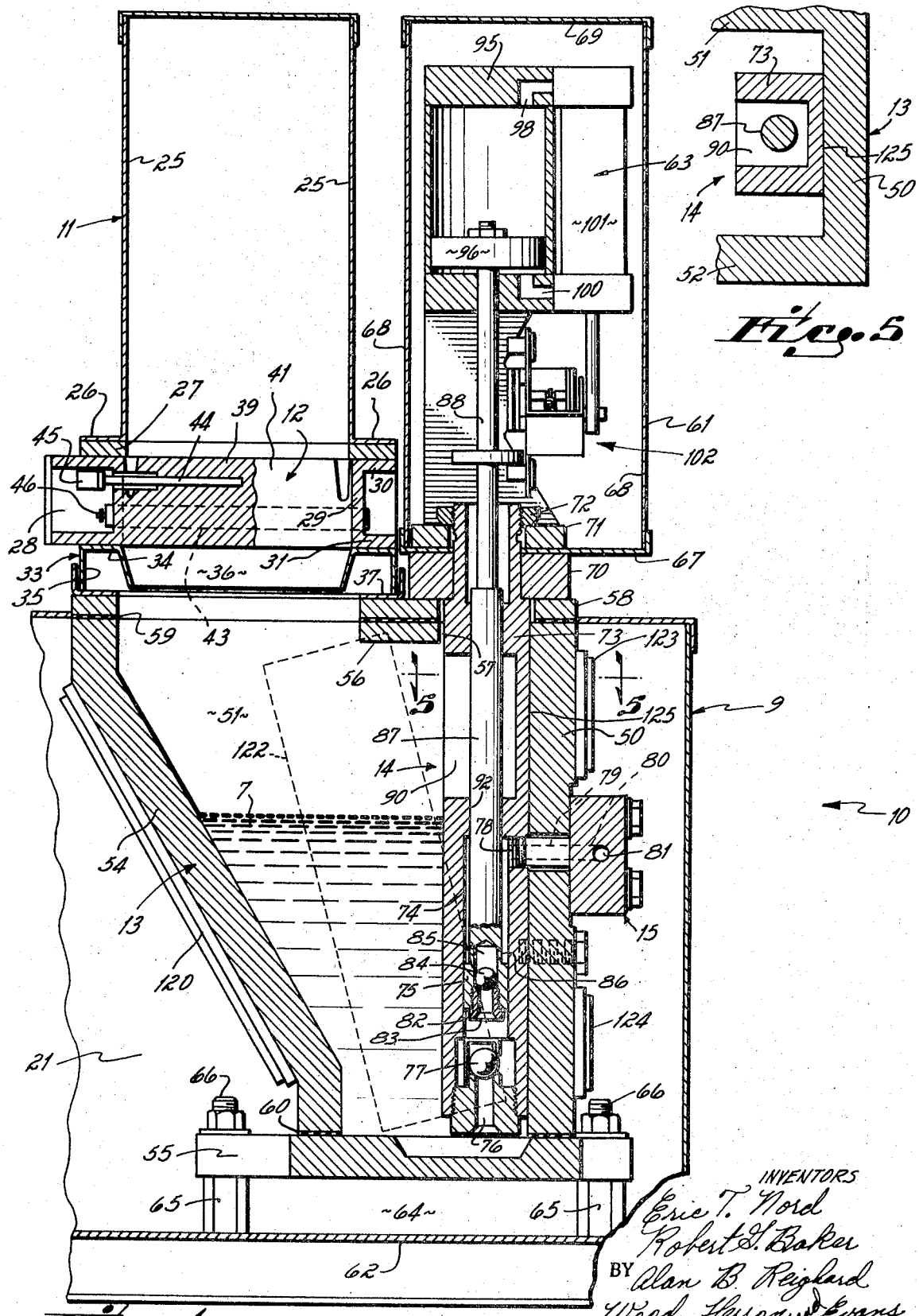

THERMOPLASTIC APPLICATOR WITH SELF-CLEANING SUPPLY RESERVOIR

BACKGROUND OF THIS INVENTION

This invention relates to the dispensing of thermoplastic materials and particularly to the dispensing of materials of the so-called "high performance" hot melt type. More particularly, the invention relates to dispensing systems in which solid thermoplastic or hot melt material is melted and then pumped in liquid form to an applicator head, the molten material being maintained molten and at or near its proper application temperature throughout the system from the liquid reservoir to the applicator head.

Thermoplastic adhesives, or so-called hot melt adhesives, are now commonplace and are used for bonding numerous diverse materials. Primarily, however, hot melts are used for sealing packages where the high speed setting time of the hot melt material may be used to advantage. More recently, though, there has been a great deal of interest in the use of hot melts for product assembly, as, for example, in the assembly of automobiles, electronics, electrical equipment, appliances, electrical components, furniture, aircraft subassemblies, and metal to metal bonds. In very few cases of product assembly, though, can the same hot melt adhesive be used as has heretofore been commonly used for packaging. Usually, product assembly requires that the adhesive have a higher cohesive strength, or better surface wetability, or a wider in-use temperature range, or a resistance to a wider variety of chemicals, environmental conditions, or all of these things. In other words, the tolerances for product assembly hot melt are very much more critical than for packaging.

For these reasons the adhesives which are presently under development or already developed and under consideration for product assembly have much different characteristics than earlier packaging type hot melts. These new hot melt adhesives have been labeled "high performance" adhesives and are usually polyesters, hydroxyvinyl resins, polyamids, etc. They have many of the desirable properties needed. Specifically, these new high performance hot melts are characterized by high tensile strength, flexibility, degree of wetability to most substrates, toughness, high resistance to outside environmental conditions, and the ability to tolerate wide in-use temperature variations. Negatively, though, these same high performance hot melts exhibit highly unstable characteristics at application temperatures, much higher application temperatures than have heretofore been required for the application of so-called packaging type hot melts, and generally higher viscosity. These so-called negative characteristics or traits have for the most part limited, if not precluded, the use of these high performance materials in many applications, primarily because of the lack of any equipment to apply the adhesive to a substrate.

Equipment which has heretofore been used to apply packaging type hot melts to substrates has upon occasion been used in an attempt to apply "high performance" hot melts to the same or different substrates. Generally, the result has been a failure or even a catastrophe, usually because either (1) the material degraded so much more quickly than the conventional packaging type hot melt materials when in the melted condition that when it finally was applied to the substrate it no longer had the adhesive characteristics for which it was designed, or (2) because the material set up or hardened in the melting and dispensing equipment prior to reaching the applicator gun or discharge nozzle. In the latter event there was often no way to remelt the material once it hardened in the pump or gun with the result that the hot melt material as well as the equipment was frozen and no longer of any use whatsoever. Consequently, the equipment was simply thrown away.

It has therefore be a primary objective of this invention to provide a new and improved apparatus for melting and dispensing so-called "high performance" thermoplastic or hot melt materials.

Still another objective of this invention has been to provide a dispensing apparatus which is operable to dispense "high performacce" hot melt material in the liquid state without any or with a very minimum of degradation of the product from the time it is melted to the time it is applied to the substrate.

Still another objective of this invention has been to provide new and improved dispensing apparatus in which the high performance hot melt material may be allowed to freeze or become set and hardened in the dispenser and in which it may subsequently be remelted so that the equipment may be shut down, as, for example, between shifts of a production facility, and then restarted or remelted without any necessity for cleaning the equipment.

Another objective of this invention has been to provide a self-cleaning thermoplastic applicator for melting and dispensing thermoplastic or "hot melt" materials. This self-cleaning feature enables the apparatus to be cleaned without dismantling or disassembly and without soaking in a solvent liquid.

These objectives are accomplished and this invention is partially predicated upon the concept of providing a new and improved hot melt dispenser which is easily maintained and cleaned and which has very even or uniform temperature throughout the complete system so that there are neither hot spots nor cold spots.

Specifically, the apparatus which accomplishes these objectives consists of a hopper for receiving the thermoplastic material in a solid state. In the bottom of the hopper there is a heated grid which operates to melt the material and allows it to pass into a small liquid container or reservoir. The temperature within this reservoir is very accurately controlled so as to maintain the liquid thermoplastic material at the proper temperature for application without heating it to such a temperature that it causes degradation of the material. There is a heated pump located internally of the liquid reservoir through which the liquid is pumped via a heated conduit and a heated dispensing gun to the dispensing nozzle. The pump is mounted on and against a side wall of the reservoir or as a part of the reservoir so that a heater for maintaining the pump at the proper temperature may be located on the exterior of the reservoir while the pump is located interiorly of it.

In order to enable the dispenser to be self-cleaning, the apparatus of this invention incorporates apparatus including a control circuit which enables the liquid reservoir tank and the melting grid to be heated to a temperature at which the thermoplastic material decomposes or burns to a powdered ash. The temperature at which this occurs for most lost hot melt materials is between 700° and 1,000°F. It has been found that the polyamide, polyester, and ethylene vinyl acetate (EVA) hot melt adhesives all burn or decompose to a powdered ash condition at a temperature which varies from 700°–1,000°F. The higher the temperature, the faster the decomposition occurs. Specifically, it has been found that the polyamide and polyester hot melt materials decompose to a powdered ash in approximately 10–12 minutes at 1,000°F. The EVA hot melt adhesives decompose slightly faster, apparently because of the high wax content of these adhesives.

For purposes of self-cleaning, the apparatus of this invention incorporates two thermostats, one for controlling the temperature of the grid and tank heaters during melting and dispensing of the thermoplastic material, and the other to control the temperature of these heaters during cleaning of the apparatus. The latter thermostat maintains the heaters at a temperature of approximately 1,000°F. Of course, the materials employed in the tank and the grid must be capable of withstanding these temperatures and are therefore generally made from stainless steel or high temperature cast iron.

One advantage of this apparatus is that the so-called high performance hot melt material may be allowed to harden or set up in the equipment and may subsequently be remelted or converted back to a liquid state. There is no necessity for tearing the equipment apart or for cleaning it every time the dispensing apparatus is shut down or turned off for a prolonged period of time.

Still another advantage of this invention is that it enables the dispensing apparatus to be easily cleaned without disassembly or soaking in a solvent. All that is required is for the operator to close a switch which causes the tank and grid to be heated to a very high temperature at which the thermoplastic material chemically decomposes or oxidizes, After approximately ten minutes at this temperature, the resulting ash may easily be swept away.

These and other objectives and advantages of this invention will be more readily apparent from the description of the drawings in which:

FIG. 2 is a side elevation view, partially broken away of dispensing apparatus made in accordance with the invention of this application.

FIG. 3 is a cross sectional view taken along line 3—3 of FIG. 2.

FIG. 4 is a cross sectional view taken on line 4—4 of FIG. 3.

FIG. 5 is a cross sectional view taken along line 5—5 of FIG. 4.

FIG. 6 is an electrical schematic diagram of a control circuit for controlling the temperature of the tank and grid so as to enable these components to be self-cleaning.

Figure 1:
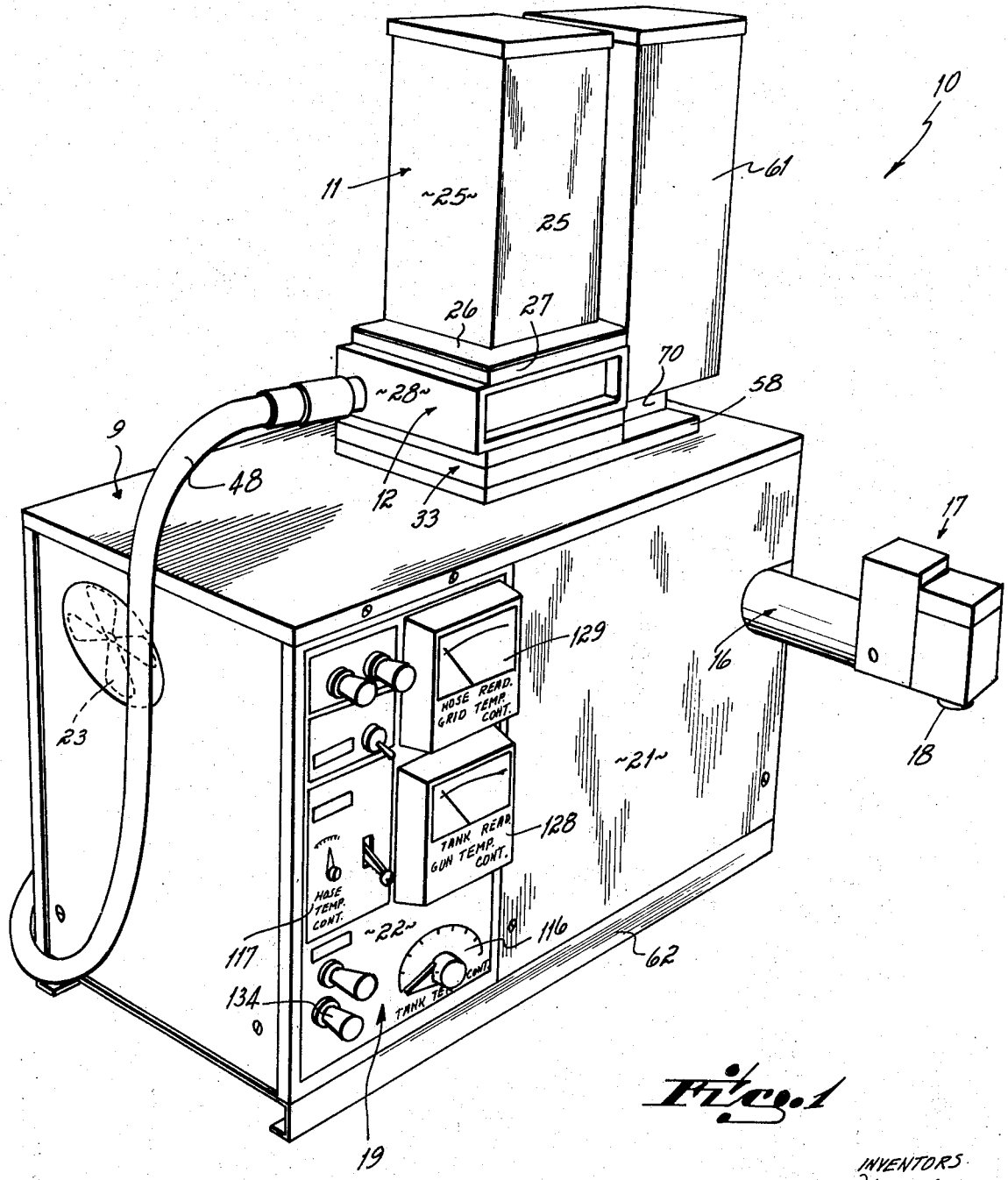
FIG. 1 is a perspective view of a dispensing apparatus made in accordance with the invention of this application.

Referring first to FIG. 1, 2 and 3, it will be seen that a preferred embodiment of an applicator system 10 incorporating this invention comprises a hopper 11 having a heated grid 12 at the bottom for melting solid thermoplastic material 8 contained in the hopper. Beneath the hopper there is a reservoir 13 for catching and storing the melted thermoplastic material. The liquid material is pumped from the reservoir 13 by a pump 14. This pump supplies the heated material in the liquid form through a manifold block 15 and heated hose or pipe 16 to a dispensing gun 17. The gun has a nozzle outlet 18 through which the liquid material is dispensed onto a substrate.

The complete dispensing system 10 is contained within a metal cover or housing 9. This housing 9 also contains the control system 19 for controlling the melting of the thermoplastic material and the maintenance of it in the liquid state.

One of the characteristics of high performance hot melt material is its instability at application temperatures. The instability occurs because of the tendency for the material to break down or lose its adhesive qualities in the liquid state when exposed to oxygen. Additionally, this instability increases with the increase in the temperatures of the material, i.e., the higher the temperature of the material, the greater the instability or the tendeny for the material to break down and lose its adhesiveness. The longer the material is maintained in the liquid state, the greater is the breakdown. consequently, it is preferable to melt the material and maintain it in the liquid state for a minimal time before it is applied to a substrate. To avoid exposure of the melted material to atmosphere and consequently to oxygen, a nitrogen or inert gas blanket is usually provided over the top of the liquid reservoir to prevent oxygen from coming into contact with the material while in the liquid state.

To minimize thermal degradation of the material, this system is so constructed as to avoid "hot spots." To that end, it includes numerous individual heaters and heater controls for maintaining an even and controlled temperature throughout the system. The heater controls are primarily electrical controls and are for the most part contained within the housing 18 in a separate section 22 which is enclosed and isolated from the remainder of the housing. Specifically, an insulated baffle 20 extends across the housing and isolates the heated section 21 from the unheated section 22. Additionally, a fan 23 (FIG. 1) is located within the electrical control section 22 of the housing 18 to provide a continuous stream of cooling air over the electrical components.

Referring now to FIGS. 1 and 4, it will be seen that the hopper 11 is generally tubular in configuration and has four side walls 25. These side walls 25 terminate in a lower flange 26 which is bolted or otherwise fixedly secured to a base ring 27. This ring is in turn bolted or otherwise fixedly secured to a grid ring 28. This grid ring has four side walls 29 of identical configuration. The walls 29 form an upper peripheral flange 30 which extends completely around the ring and a parallel lower flange 31. The hopper supporting base ring 27 rests atop and is secured to the upper flange 30, and the lower flange 31 rests atop and is fixedly secured to a lower mounting ring 33. This ring 33 has an upper flat surface 34 which supports the lower flange 31 of the grid ring 28. A vertical flange 35 around the periphery of the ring 33 supports the hopper in a reservoir ring 37 located atop the reservoir 13. Additionally, on the inside of the ring 33, there is a generally funnel-shaped section 36 which extends downwardly and inwardly to direct liquid material from the heating grid 12 into the liquid storage reservoir 13.

The grid 12 forms the bottom of the hopper 11. It consists of a series of grid bars 39 (FIG. 3) bolted together at their ends by a pair of assembly bolts (not shown). In the preferred embodiment slots 41 extend between the individual grid bars 39 so as to permit melted material to pass downwardly between the bars and through the funnel-shaped section 36 of the hopper supporting ring 33 into the reservoir 13.

As is explained more fully hereinafter, an electrical resistance heating element or heating bar 43 extends completely through each of the grid bars 39. Additionally, the central grid bar contains an axial recess within which there is located an electrical thermocouple 44. This thermocouple measures the temperature of the grid 12 and is used to control the flow of the electricity through the heating elements 43.

On the end of each electrical heater bar 43 of the grid, there is an electrical contact 46 by means of which the individual heater elements may be electrically connected to the control panel 19 mounted within the section 22 of the housing 9. Additionally, the thermocouple 44 has an electrical coupling 45 on its end which enables it to be electrically coupled to a lead which extends into the electric control panel contained within the housing section 22. The leads from the electrical contacts 45 and 46 all extend from the grid down into the electrical control section 22 of the housing 9 in a single cable 48 (FIG. 1). This cable surrounds and protects the individual leads between the grid and the housing.

The reservoir 13 consists of a vertical rear wall 50, a pair of side walls 51 and 52, and a generally tapered front wall 54. The bottom of the reservoir is formed by a base plate 55.

The rear wall 50 of the reservoir has an upper forwardly extending flange 56 through which an aperture 57 extends for the reception of a pump tube, as is explained more fully hereinafter. Preferably there is a top plate 58 in the form of a ring which is secured to the top of the reservoir. Between the top ring and the top of the side walls there is preferably a seal 59. Similarly, there is a seal 60 between the bottom of the side walls and the top surface of the base plate 55.

The base plate 55 of the reservoir is supported upon the top of the base 62 of the housing 9. As may be seen most clearly in FIG. 3, this housing base 62 is generally channel-shaped in cross section so that there is a large air space beneath the housing. Preferably there is another air space 64 located between the bottom of the base plate 55 and the top of the housing base 62. This latter space 64 is provided by spacer sleeves 65 which surround bolts 66 and are located between the top of the housing base 62 and the bottom of the reservoir base plate 55. The spacer sleeves enable the base plate 55 to be bolted to the housing base 62 but at a distance spaced from it.

The pump 14 is an air motor operated single piston double-acting pump. It is referred to as a double-acting pump because it takes in a cylinder full of molten or liquid material on the upstroke of the pump and discharges one half the intake volume on an upstroke and one half on the downstroke. It is termed an air motor operated pump because it is actuated by a pneumatic motor 63 mounted on top of the pump and surrounded by a housing or cover 61.

The pump housing 61 or cover is generally tubular in configuration and comprises a bottom cup 67, a tubular side wall 68 and a cap 69. The bottom cup 67 of the cover 63 rests atop a mounting ring 70. The cover is secured to this mounting ring by a locking ring 71 and nut 73. The nut is threaded onto the top of the pump tube or cylinder 73 so as to secure the cover 61 to the pump 14.

A complete description of the pump 14 and the air motor 63 for actuating it may be found in U.S. Pat. No. 3,585,361 of Samuel R. Rosen et al for "Supply System for Thermoplastic Materials," which patent was issued on June 15, 1971, and is assigned to the assignee of this application. Briefly, it comprises the housing 73 within which there is located a cylinder 74. A piston 75 is reciprocable within this cylinder 74. The lower end of the cylinder 74 terminates in an inlet 76 closed at its upper end by a ball check 77. Cylinder 74 communicates at its upper end through an outlet 78 with a transverse passage 79 which leads to a passage 80 of the manifold block 15. The manifold block in turn has a passage 81 which communicates through the conduit 16 to the dispensing gun 17. The gun in turn controls the flow of material from the pump through the conduit and the gun 17.

The lowermost end of piston 75 is interiorly threaded to receive a block 82 having an inlet 83. At its upper end inlet 83 communicates through a ball check 84 with a chamber 85 having ports 86 that lead into cylinder 74. A piston rod 87 integral with piston 75 extends upwardly therefrom through cylinder 74 and pump housing 73 and is integrally joined to a connecting rod 88 of the pneumatic motor 63.

Above the point at which the cylinder 74 communicates with the passage 78, there is a cutout or relief 90 in the pump housing 73. This relief exposes the piston rod 87 to the interior of the reservoir 13. The height of this cutout or relief is approximately the same as the stroke of the pneumatic motor which actuates the piston. The purpose of the relief is to drain molten material accumulated on the piston rod 87 back into the reservoir. Molten material contacts the piston rod 87 in the chamber 74 and is carried through the aperture 92 of the housing 73. The relief 90 allows this material to drain back into the reservoir. It will be noted that no portion of the piston rod 87 ever travels from within the chamber or cylinder 74 to a point outside the reservoir. Since the reservoir is a heated area, the material accumulated on the piston rod is thus never exposed to the chilling ambient temperatures outside the reservoir.

In operation assume that the piston 75 is at its lowermost position just beginning an upstroke and that the volume of cylinder 74 is occupied and piston rod 87 is filled with liquid thermoplastic material. Piston 75 as it rises forces the liquid material above and through outlet 78, the ball check 84 being held tightly closed by fluid pressure exerted thereon. Ball check 77 moves upwardly off its seat in response to the pressure of incoming material seeking to fill the void left by piston 75. When piston 75 has completed its upstroke, cylinder 74 is filled with liquid material which is drawn in on the upstroke. On the downstroke of the piston 75, ball check 77 remains firmly seated while ball check 84 is moved upwardly upon its seat permitting displaced liquid material to move upwardly through inlet 83 and through ports 86 to displace material forced through outlet 78.

The pump 14 includes no packing glands. Instead, the piston 75 and the piston rod 87 are designed to have a close fit with the walls of the pump housing. This omission of packing glands enables the pump to be operated at higher temperatures than would be possible if the pump contained packing glands since most packing gland materials deteriorate from high temperatures. Additionally, the thermoplastic material can be allowed to solidify in the pump and may subsequently be reheated and melted which would deteriorate the packing glands if present. Liquid thermoplastic material which escapes upwardly between the piston rod 87 and aperture 92 is returned to the reservoir through the recess of relief 90 in the housing. Because of the height of the relief, no portion of the piston rod 87 which ever comes in contact with the materials in the cylinder 74 passes out of the reservoir and is exposed to ambient temperature. Consequently, there is no chance for the material to chill and to build up as a solid on the piston rod. In the absence of the relief 90, material could and would be carried on the piston rod outside of the pump housing 73 where it could and would build up as a solid to freeze and block the piston rod in the housing 73.

The air motor 63 comprises a cylinder housing 95 within which an air piston 96 reciprocates to drive a connecting rod 88 and attached piston rod 87. Air is supplied to the top side of the piston 96 through a cylinder port 98 and to the bottom side of the piston 96 through a port 100. The flow of air to these ports is controlled by a conventional four-way valve 101. The position of the spool (not shown) of this valve 101 is controlled by a snap action over-center mechanism 102. A detailed description of the valve and over-center mechanism, as well as its manner of operation, may be found in the aboveidentified U.S. Pat. No. 3,585,361. Since its operation is conventional and is illustrated and described in numerous issued patents, it is not described in detail herein.

Referring to FIG. 4, it will be seen that the manifold block 15 is bolted to the exterior of the rear wall 50 of the reservoir. The transverse passage 81 of this block cummunicates with the central passage 104 of a pipe 105. One end of this pipe is threaded into the manifold block 15 and the opposite end is threaded into the intake opening of the dispenser gun 17. An electrical resistance heating wire 106 is wrapped around the pipe 105 in a generally helical configuration. This wire is connected by a pair of leads (not shown) to the electrical control panel contained within the section 22 of the housing 9.

Insulation 107 surrounds the heating element 106 to protect individuals against contact with it, as well as to avoid the loss of heat to the atmosphere. Inside the pipe 105 there is a conventional bulb type thermostat tube 108 which is coupled by a capillary tube 109 to a thermostat control swtich (not shown) located in the electrical control compartment 22 of the housing 9.

The applicator gun 17 is a conventional pneumatically actuated gun used for dispensing molten thermoplastic material. One gun suitable for this application is completely described in U.S. Pat. No. 3,570,725 issued Mar. 16, 1971, and assigned to the assignee of this application. This gun includes a heater 110 and a thermocouple 111 connected to a control circuit in the housing compartment 22 for controlling the flow of electricity to the heater 110.

Very nearly all "high performance" hot melt materials undergo thermal degradation if subjected to a temperature substantially above the melting temperature of the material for any protracted period of time. Similarly, these materials undergo thermal degradation if subjected to temperature above that required to maintain them in the liquid state if subjected to that temperature for a long period of time. Consequently, it is importat in any system for dispensing these "high performance" thermoplastic materials that the system maintain the melted mterial in the liquid state but at a minimal temperature and for a minimal length of time. Additionally, these materials freeze very quickly if subjected to a temperature below the freezing point. Consequently, temperature control throughout the system is critical to the success of a dispensing system for these materials. To the end of maintaining controlled temperature throughout the system, this dispensing system includes five separate heating elements mounted at strategic points to the walls of the liquid reservoir 13. These heating elements are resistance heaters or so-called "strip heaters" encased in mica and flat metal plates. Three of these heaters 120, 121, and 122 are mounted on the front and side walls of the reservoir, respectively. Additionally, there are a pair of flat plate or "strip" electrical resistance heaters 123 and 124 secured to the rear wall of the reservoir above and beneath the manifold block 15, respectively.

It is to be noted that the pump housing 73 has a flat surface 125 which contacts and is engaged with the inside surface of the rear wall 50 of the reservoir. The heaters 123 and 124 transmit heat directly into the wall 50 and through the wall into the pump housing. Prior to this invention it has been common practice, as illustrated in the above-identified U.S. Pat. No. 3,585,361, to mount the pump housing on the inside of the reservoir but spaced from the wall of the reservoir. Consequently, heat transmitted to the pump was always required to pass through the thermoplastic material. In the case of "high performance" hot melt material, this arrangement is unsatisfactory since it inevitably results in the material freezing in the pump and being incapable of being reheated to reconvert it to the liquid state without decomposing or degrading the material due to the long time for the pump to reach application temperature. The alternative is to mount the pump heaters on the interior of the reservoir and around or in the pump cylinder. This is also generally unsatisfactory because the presence of electrical elements in the liquid reservoir is very inconvenient and unsafe. Additionally, it complicates the servicing and maintenance of the unit. The arrangement of this pump dispensing system, though, with the flat surface 115 of the pump housing engaged with the wall of the reservoir and heaters located on the exterior of that wall to transmit heat directly into the pump housing, maintains an even temperature of the liquid materials as well as enabling frozen solid material in the pump housing to be reheated and reconverted back to the liquid state. Freezing often occurs when the system is shut down, as, for example, occurs between shifts in a commercial production facility.

Electric power is supplied to the five heaters 120–124 under the control of a bulb type thermostat 126 secured to the exterior of the housing 13. This thermostat measures the temperature of the reservoir and indirectly the temperature of the melted thermoplastic material 7 contained within the reservoir. In the event that the temperature measured by the thermostat 126 is less than the temperature set at the tank temperature control 116, the electric control circuit supplies electric power to all five of the heating elements 120–124 until the temperature of the liquid material reaches that preset into the control 116. The temperature is measured by a readout thermocouple 127 and may be visually inspected on a gauge 128 of the electrical control system.

The pipe 105 is heated to the temperature preset in the hose temperature control 117 of the control panel. When the pipe temperature as measured by the thermostat 108 reaches the preset temperature, electric power is shut off to the electrical resistance heater 106. To visually inspect the temperature of the pipe, a thermocouple 118 secured to the pipe controls a needle of gauge 129. In the same manner electric power is supplied to the grid 12 to maintain it at the temperature preset on the grid control 129 of the electrical control panel. When the temperature as measured by the thermocouple 44 reaches the preset temperature, electric power is shut off to the electrical resistance heaters 43 of the grid. Likewise, te gun 17 temperature is measured by the thermocouple 111 and is maintained at the temperature preset at the control 128.

It is to be noted that the meters 128 and 129 are both control meters which have two readout needles, one for adjustment of the temperature of the control relay associated with the meter, and the other for readout of a temperature. In this control unit the two needles of each meter have been attached to different components of the system rather than to a single component, as is the more general practice.

Since the grid control, the pipe control, the tank temperature, and the gun temperature control are all mutually independent and may be individually set, it is possible with the apparatus of this invention to control and maintain the grid at a different temperature from the tank and the tank at a different temperature from the dispensing pipe and the gun. This is desirable in the case of many materials, as, for example, one high performance thermoplastic material which melts at a temperature of 425° F. and freezes at a temperature of 375° F. In the case of this material, it is preferable to maintain the grid at a temperature slightly above 425° F. and to maintain the temperature in the reservoir slightly above 375° F. In this way the degradation of the material while maintained in the liquid state in the reservoir is minimized. The pipe and gun temperature is maintained at whatever temperature produces the optimum viscosity for passing or dispensing it through the nozzle 18 of the dispensing gun 17.

In operation, solid thermoplastic material is inserted into the hopper 25 with the hopper cover removed. This solid material may be in the form of chunks, solids, powder, or bricks. After filling the hopper, the cover is replaced so as to preclude the escape of nitrogen supplied to the reservoir through a hose (not shown). This nitrogen reduces the rate of degradation of the material which would otherwise occur due to exposure of the material to oxygen while in the melted state. The solid thermoplastic material contained in the hopper 11 melts as a result of exposure to the heat of the grid 12, which grid is maintained at a temperature slightly above the melting temperature of the material. The melted material then flows down through the passages between the grid bars 39 and into the liquid reservoir 13. From this reservoir it is pumped by the pneumatically actuated double-acting piston pump 14 through the passages 78–80 and 81 into the heated pipe 105. The heated material is supplied under pressure through this pipe to the gum 17. From the nozzle 18 of the gun, the material is dispensed in accordance with the opening of a valve contained within the gun. This valve may be opened manually or under the control of a preset program as is conventional in the dispensing of hot melt materials through gun type applicators.

Referring now to FIG. 6, there is illustrated an electrical control circuit for enabling this dispensing apparatus to be self-cleaning. Specifically, this control circuit enables the liquid reservoir tank heaters 120–124 and the grid heaters 43 to be heated to a temperature much greater than the melting temperature of the thermoplastic materials. Specifically, this control circuit enables these heaters to be heated to a temperature in the range of 700°–1,000° F. at which temperature the liquid thermoplastic material decomposes or burns to a powdered ash. Once converted to a powdered ash, it may easily be swept away.

This control circuit consists of a source of electrical power 130 which may be alternately connected through an electrical switch 131 and a pair of thermostats 116 and 132 to the parallel connected electrical heaters 120–124. Similarly, the five electrical resistance heaters 43 of the grid may alternately be connected to the source of electrical power 130 through the switch 131 and the two thermostats 129 and 133. The switch 131 has a manually controlled actuator button 134 on the control panel. When this switch is pushed inwardly it connects the heaters 120–124 to the source of electrical power 130 through the switch contacts 135 and the high temperature thermostat 132. Normally, though, when this cleaning switch is unactuated the heaters 120–124 are connected to the source of electrical power 130 through the normally closed switch contacts 136 and the low temperature thermostat 116. Similarly, in normal operation when the self-cleaning switch 134 is not actuated, the grid heaters 43 are connected through the con-tacts 136 and the low temperature thermostat 129 to the source of power 130.

In operation, the thermostat 129 is generally set at the melting temperature or slightly above the melting temperature of the thermoplastic material. Similarly, the thermostat 116 is set at a temperature which will maintain the liquid thermo-plastic material in the liquid state with a minimum of thermal degradation. With the termostats so set and the switch 134 not actuated, the low temperature thermostats 116, 139 control the tank heaters 120–124 and the grid heaters 43, respectively. To clean the tank and grid, all that is required is to manually actuate the switch 134 on the face of the control panel. Actuation of this switch closes the contacts 135 and opens the contacts 136 so that the control circuit to the tank heaters 120–124 and the grid heaters 43 is through the high temperature thermostats 132, 133, respectively. These thermostats are generally set to a temperature of approximately 1,000°F. plus or minus 200°F. The higher the setting of the thermostat, the shorter decomposition time required to burn off or chemically decompose the thermoplastic material and convert it to a powdered ash.

The heated pipe 105 and the gun 17 both contain electrical resistance heaters but these heaters are not heated to a high temperature during the cleaning cycle. The reason for the omission of high temperature controls for these heaters is that they are easily cleaned by pumping a solvent through the pipe and the gun. Additionally, there is very little oxygen present in either the pipe or the gun so that it is difficult and takes a long time to thermally burn off or degrade the material in these closed chambers.

As an alternative to the utilization of the control circuit illustrated in FIG. 6, it is possible and in some instances preferable to substitute two heaters for each of the single heaters 120–124. Each of the pairs of heaters may then be connected in series for normal operation and switched to parallel connection for the cleaning operation. For example, if the two heaters in a pair require 200 watts each to raise the temperature to 1,000° F., connecting these same heaters in parallel gives a total power input of 400 watts. When this same pair is connected in series, the power input is 100 watts so that the unit may be connected in series to give a low concentration of heat during normal low temperature operation and switched to a parallel connection to give the high temperature heat required for cleaning. The primary advantage of this type of series-to-parallel switching connection of pairs of heaters is that it minimizes high temperature hot spots on the tank surface.

The primary advantage of this invention resides in its ability to melt and dispense materials which heretofore have never been dispensed through gun type applicators, principally because of the inability to melt the material and convey it to the gun through a pumping system without its becoming frozen in the system. The application of this invention enables the high performance hot melt material to be supplied to the gun under very accurate temperature controls and even to be remelted in the equipment if it should become either inadvertently or intentionally solidified in the pump or anywhere in the system.

Another advantage of this invention is the ease with which it enables the dispenser to be cleaned. Specifically, it incorporates a self-cleaning feature which through the application of heat breaks down and chemically decomposes a thermoplastic material so as to convert it to a powdered ash which may be easily swept away.

While only a single preferred embodiment of the invention has been illustrated in this application, persons skilled in this art will appreciate changes and modifications which may be made without departing from the spirit of this invention. Therefore, we do not intend to be limited except by the scope of the appended claims.

Having described our invention, we claim:

1. An apparatus for melting and dispensing thermoplastic material comprising
    a hopper for receiving the thermoplastic material while in a solid state, said hopper having a continuous side wall, a bottom wall and an open top for receiving said material, a discharge opening in said bottom wall, said bottom wall having a heating surface exposed to said thermoplastic material and means for heating said surface so as to melt solid thermoplastic material contained in said hopper,
    a liquid reservoir located beneath and in fluid communication with said bottom wall of said hopper, said reservoir having a continuous side wall and a bottom wall,
    an applicator head including a discharge nozzle and an inlet,
    means including a pump and a conduit connecting said applicator head inlet to said liquid reservoir, said pump being mounted upon the inside surface of said liquid reservoir side wall and in intimate contact with said reservoir side wall over a sufficiently large area to enable heat to be transferred to said pump through said reservoir side wall, and means located externally of said liquid reservoir for heating said pump.

2. The apparatus of clam 1 which further includes means for heating said liquid reservoir to maintain liquid contained in said reservoir in a liquid condition.

3. The apparatus of claim 2 which further includes means for cleaning said hopper bottom wall surface and said liquid reservoir, said cleaning means including means for causing said means for heating said hopper bottom wall surface and said means for heating said liquid reservoir to heat to a temperature sufficiently high to completely decompose said material and convert it to a powdered ash.

4. The apparatus of claim 3 in which said cleaning means is operable to cause said means to heat said hopper bottom wall surface and said means for heating said reservoir to heat to a temperature in excess of 700°F. but less than 1,500°F.

5. The apparatus of claim 3 in which said cleaning means causes said hopper bottom wall heating means and said reservoir heating means to heat to a temperature of approximately 1,000°F.

6. The apparatus of claim 1 in which said pump heating means includes a heater element mounted on the exterior of said liquid reservoir in such a manner that heat may be transferred from said element through said reservoir side wall to said pump.

7. The apparatus of claim 6 which further includes means for heating the side walls of said liquid reservoir and additional means for heating said conduit.

8. The apparatus of claim 7 in which all of said heating means comprises electrical heaters and further including control elements for independently controlling the flow of electricity to said reservoir heating means, said conduit heating means, and said hopper bottom wall surface heating means.

9. The apparatus of claim 8 which further includes a cover housing surrounding and enclosing said liquid reservoir and reservoir heaters, said cover housing being divided into two compartments separated by an insulated divider wall, one of said compartments enclosing said reservoir and the other compartment enclosing electrical elements of an electrical control panel for controlling the temperature of said heating means.

10. The apparatus of claim 9 which further includes a fan contained in said other compartment for cooling said other electrical control panel enclosing compartment.

11. An apparatus for melting and dispensing thermoplastic material comprising
    means including a liquid reservoir for receiving the thermoplastic material while in a solid state and for melting said solid thermoplastic material to convert it to a liquid state and for holding said liquid thermoplastic material while maintaining it in a liquid state, said liquid reservoir having a continuous side wall and a bottom wall,
    an applicator head including a discharge nozzle and an inlet, means including a pump connecting said applicator head inlet to said liquid reservoir, said pump being mounted internally of said liquid reservoir upon the inside surface of said reservoir side wall, said pump being in intimate contact with said reservoir side wall over a sufficiently large area to enable heat to be transferred to said pump through said reservoir side wall, and said reservoir heater means including a heater element mounted upon the exterior of said reservoir side wall for heating said pump, said heater element being mounted directly opposite said pump on the exterior of said side wall so as to facilitate transfer of heat through said side wall into said pump.

12. The apparatus of claim 11 which further includes a conduit extending between said pump and said application head, and means for heating said conduit.

13. The apparatus of claim 12 in which all of said heating means comprises electrical heaters and further including control elements for independently controlling the flow of electrical power to said heating means.

14. The apparatus of claim 11 which further includes means for cleaning said liquid reservoir, said cleaning means including means for causing said reservoir heater means to heat to a temperature sufficiently high to completely decompose said material and convert it to a powdered ash.

15. The apparatus of claim 14 in which said cleaning means is operable to cause said reservoir heater means to heat said reservoir to a temperature in excess of 700°F. but less than 1,500°F.

16. The apparatus of claim 14 in which said cleaning means causes said reservoir heating means to heat to a temperature of approximately 1,000°F.

17. The apparatus of claim 14 in which said cleaning means includes a high temperature thermostat set to a temperature in excess of 700°F. but less than 1,500°F.

18. An apparatus for melting and dispensing thermoplastic material comprising means including a liquid reservoir for receiving and holding the thermoplastic material while in a liquid state, said reservoir having a side wall and a bottom wall, an applicator head, means including a pump connecting said applicator head to said liquid reservoir, said pump being mounted internally of said liquid reservoir upon an inside surface of said reservoir side wall, said pump being in intimate contact with said reservoir side wall over a sufficiently large area to enable heat to be transferred to said pump through said reservoir side wall, means including a heater element mounted upon the exterior of said reservoir side wall for heating said pump, said heater element being mounted directly opposite said pump on the exterior of said side wall so as to facilitate transfer of heat through said side wall into said pump, and means for cleaning said liquid reservoir, said cleaning means including means for heating said reservoir to a temperature sufficiently high to completely decompose said material and convert it to a powdered ash.

19. The apparatus of claim 18 in which said reservoir heating means is operable to heat said reservoir to a temperature in excess of 700°F. but less than 1,500°F. to clean said reservoir.

20. The apparatus of claim 18 in which said reservoir heating means heats said reservoir to a temperature of approximately 1,000°F. to clean said reservoir.

21. The apparatus of claim 18 in which said reservoir cleaning means includes a high temperature thermostat set to a temperature in excess of 700°F. but less than 1,500°F.

* * * * *

UNITED STATES PATENT OFFICE
CERTIFICATE OF CORRECTION

Patent No. 3,792,801    Dated February 19, 1974

Inventor(s) Robert G. Baker, Eric T. Nord, Alan B. Reighard

It is certified that error appears in the above-identified patent and that said Letters Patent are hereby corrected as shown below:

Column 2, line 11, the word "be" should read --been--; line 67, the word "lost" should be deleted.

Column 5, line 67, "73" should be --72--.

Column 9, line 67, "gum" should be --gun--.

Signed and sealed this 24th day of September 1974.

(SEAL)
Attest:

McCOY M. GIBSON JR.
Attesting Officer

C. MARSHALL DANN
Commissioner of Patents